(12) United States Patent
Liu

(10) Patent No.: US 12,292,068 B2
(45) Date of Patent: May 6, 2025

(54) MOBILE PHONE BRACKET

(71) Applicant: DONGGUAN DONGDING ART& CRAFT CO., LTD, Dongguan (CN)

(72) Inventor: Xiuxi Liu, Changning (CN)

(73) Assignee: DONGGUAN DONGDING ART & CRAFT CO., LTD, Dongguan (CN)

( * ) Notice: Subject to any disclaimer, the term of this patent is extended or adjusted under 35 U.S.C. 154(b) by 22 days.

(21) Appl. No.: 18/236,688

(22) Filed: Aug. 22, 2023

(65) Prior Publication Data
US 2024/0360854 A1    Oct. 31, 2024

(30) Foreign Application Priority Data

Apr. 25, 2023    (CN) .......................... 202310449978.5

(51) Int. Cl.
*F16B 2/10*    (2006.01)
*F16M 13/02*    (2006.01)
*H04M 1/04*    (2006.01)

(52) U.S. Cl.
CPC .............. *F16B 2/10* (2013.01); *F16M 13/02* (2013.01); *H04M 1/04* (2013.01)

(58) Field of Classification Search
CPC ............. F16B 2/10; F16M 13/02; H04M 1/04
See application file for complete search history.

(56) References Cited

U.S. PATENT DOCUMENTS

| | | | | |
|---|---|---|---|---|
| 2021/0348629 A1* | 11/2021 | Fan | .................... | F16M 11/2064 |
| 2022/0201110 A1* | 6/2022 | Shan | .................... | F16M 11/041 |
| 2023/0089441 A1* | 3/2023 | Tu | .................... | F16M 11/2021 |
| | | | | 455/90.3 |
| 2023/0204152 A1* | 6/2023 | Zhou | .................... | F16M 11/10 |
| | | | | 248/187.1 |
| 2024/0008209 A1* | 1/2024 | Cai | .................... | G06F 1/1626 |

* cited by examiner

*Primary Examiner* — Amy J. Sterling
(74) *Attorney, Agent, or Firm* — WPAT, PC

(57) ABSTRACT

A mobile phone bracket is provided, includes a bracket body, a first clamping part for fixing the bracket body, and a second clamping part for clamping a mobile phone; the bracket body includes a first accommodating plate for accommodating the first clamping part, a second accommodating plate for accommodating the second clamping part, the second clamping part can rotate and swing along b-axis to be unfolded from the second accommodating plate and accommodated therein, the second clamping part can rotate along a1-axis and a2-axis to be adjusted to different directions, and can be accommodated in the second accommodating plate by disposing the second clamping part to rotate and swing along b-axis, adjustable direction is more comprehensive by disposing the second clamping part to rotate along a1-axis and a2-axis, and directions and positions of the second clamping part can be freely adjusted to adapt to a best user use state.

19 Claims, 9 Drawing Sheets

MOBILE PHONE BRACKET

TECHNICAL FIELD

The disclosure relates to the technical field of electronic product accessories, and more particularly to a mobile phone bracket.

BACKGROUND

Tools such as a mobile phone bracket are often needed to assist in placing a mobile phone in some applications that require long-term viewing of a mobile screen of the mobile phone. Most of existing mobile phone brackets have a low degree of freedom and a limited application range, making it difficult to meet a viewing requirement in diverse environments; or a structure of the existing mobile phone bracket is complex, inconvenient to use, and a volume of the existing mobile phone bracket is too large to carry around.

SUMMARY

1. Technical problems to be solved are as follows.

Aiming at disadvantages of the related art, a purpose of the disclosure is to provide a mobile phone bracket, which purports to solve technical problems of large volume, inconvenient portability, complex structure, and inconvenient operation in the related art.

2. Technical solutions are as follows.

The disclosure provides a mobile phone bracket, and the mobile phone bracket includes a bracket body, a first clamping part for fixing the bracket body, and a second clamping part for clamping and fixing a mobile phone; the bracket body includes a first accommodating plate for accommodating the first clamping part and a second accommodating plate for accommodating the second clamping part; the second clamping part is configured to rotate and swing along a b-axis to make the second clamping part be unfolded from the second accommodating plate or be accommodating in the second accommodating plate, and the second clamping part is further configured to rotate along an a1-axis and an a2-axis to make the second clamping part be adjusted to different clamping directions relative to the bracket body.

In an embodiment, the bracket body is cylindrical, the first accommodating plate is fixedly connected to the second accommodating plate to form the bracket body, and the fist accommodating plate and the second accommodating plate are configured to divide an internal space of the cylindrical bracket body into two spaces for accommodating.

In an embodiment, an end of the bracket body is a fixed plane, and the fixed plane is configured to cooperate with the first clamping part to fix the bracket body to a target position, another end of the bracket body is a movable plane, and the movable plane is provided with a support base thereon, a center of the movable plane is provide with a first support rotation shaft, the first support rotation shaft is configured to extend towards the support base and penetrate through a center of the support base, to make the support base be movably installed on the movable plane with the a1-axis as a rotating axis; and the support base is provided with a set of fixed members fixedly disposed on the support base, the set of fixed members are movably connected to a second support rotation shaft with the b-axis as a rotating axis, and the second support rotation shaft is movably connected to the second clamping part with the a2-axis as a rotating axis, to thus make the second clamping part to rotate relative to the support base along the a2-axis or the b-axis.

In an embodiment, the support base is provided with an end cap thereon, and the end cap is fixedly connected to the support base.

In an embodiment, the second clamping part is configured to be driven by the set of fixed members on the support base to rotate eccentrically relative to the bracket body.

In an embodiment, a shape of the second support rotation shaft is a T-shaped, both ends of a head of the T-shaped second support rotation shaft are movably connected to the set of fixed members, the b-axis is concentric with the head of the T-shaped second support rotation shaft to support the T-shaped second support rotation shaft to rotate and swing, the second support rotation shaft is movably connected to the second clamping part through a tail of the T-shaped second support rotation shaft, and the a2-axis is concentric with the tail of the T-shaped second support rotation shaft.

In an embodiment, a side of the movable plane is provided with a U-shaped opening, the U-shaped opening is configured to accommodate the tail of the T-shaped second support rotation shaft when the second clamping part is accommodated in the bracket body.

In an embodiment, the first clamping part is configured to be pulled out and automatically retracted through a fixed gap between the first accommodating plate and the second accommodating plate; the first clamping part is a L-shaped pulling plate, a side of the L-shaped pulling plate is a clamping plate, and the clamping plate is configured to clamp with the fixed plane of the bracket body; another end of the L-shaped pulling plate is an energy storage plate, and the energy storage plate is slidably installed on the first accommodating plate; the energy storage plate is provided with an energy storage tank thereon, and the energy storage tank is provided with an elastic member therein, the first accommodating plate is provided with a stopper thereon, and the stopper is configured to penetrate through the energy storage tank; and an end of the elastic member is fixed to a side of the energy storage tank, and another end of the elastic member is configured to abut against the stopper.

In an embodiment, the first clamping part is configured to move back and forth along a single straight line, the first accommodating plate is provided with a convex column thereon, and the energy storage plate is provided with a guide tank therein for cooperating installation with the convex column.

In an embodiment, an outer side of the first accommodating plate is provided with a slide button, an outer wall of the first accommodating plate is provided with a button sliding groove, the slide button is provided with a connection block thereon, and the connection block is configured to penetrate through the button slide groove and fixedly connect to an end of the energy storage plate.

3. Beneficial effects are as follows.

Compared to the related art, the beneficial effects of the disclosure are as follows.

Before using the mobile phone bracket of the disclosure, the first clamping part and the second clamping part are correspondingly stored in the first accommodating plate and the second accommodating plate to reduce an overall volume of the mobile phone bracket, which is easy to carry.

In a situation that the mobile phone bracket is used, the first clamping part is clamped and fixed on a table board or other support carrier, and the first clamping part is configured to fix the bracket body to the target position, the second clamping part is rotary unfolded along the b-axis to make the second clamping part separate from the second accommodating plate, and a position of the second clamping part is adjusted in directions of the a1-axis and the a2-axis according to an actual need of a user, to thus adjust the second clamping part at an easy to use and grip state.

Specifically, the second clamping part can be accommodated in the second accommodating plate by disposing the second clamping part to rotate and swing along the b-axis, which can effectively reduce the overall volume of the mobile phone bracket for easy portability. An adjustable direction of the second clamping part is more comprehensive by disposing the second clamping part to rotate along the a1-axis and the a2-axis, when the first clamping part is clamped and fixed on the support carrier at any angle, a direction and a position of the second clamping part can be freely adjusted to adapt to a best user use state, and an operation of the mobile phone bracket is simple, an adjustment of the mobile phone bracket is convenient, which is conducive to promotion.

Figure 1:
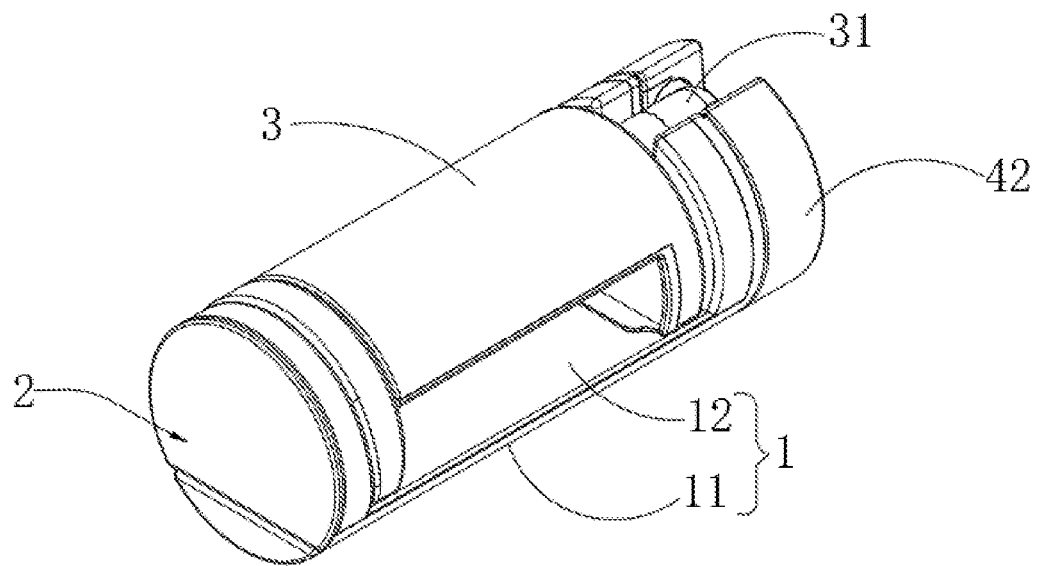
FIG. 1 illustrates a first three-dimensional structure diagram of a mobile phone bracket in an accommodating state according to an embodiment of the disclosure.

Description of reference numerals: 1—bracket body; 11—first accommodating plate; 111—stopper; 112—convex column; 113—button slide groove; 12—second accommodating plate; 13—movable plane; 131—first support rotation shaft; 132—opening; 14—fixed plane; 2—first clamping part; 21—clamping plate; 22—energy storage plate; 221—slide button; 222—connection block; 23—energy storage tank; 24—elastic member; 25—guide tank; 3—second clamping part; 31—second support rotation shaft; 4—support base; 41—fixed member; 42—end cap.

DETAILED DESCRIPTION OF EMBODIMENTS

Technical solutions in an embodiment of the disclosure will be clearly and completely described in conjunction with drawings in the embodiment of the disclosure below.

As shown in FIGS. 1-4, the disclosure provides a mobile phone bracket, and the mobile phone bracket includes a bracket body 1, a first clamping part 2 for fixing the bracket body 1, and a second clamping part 3 for clamping and fixing a mobile phone. The bracket body 1 includes a first accommodating plate 11 for accommodating the first clamping part 2 and a second accommodating plate 12 for accommodating the second clamping part 3. The second clamping part 3 is configured to rotate and swing along a b-axis to make the second clamping part 3 be unfolded from the second accommodating plate 12 or be accommodated in the second accommodating plate 12, and the second clamping part 3 is further configured to rotate along an a1-axis and an a2-axis to make the second clamping part 3 be adjusted to different clamping directions relative to the bracket body 1.

Figure 2:
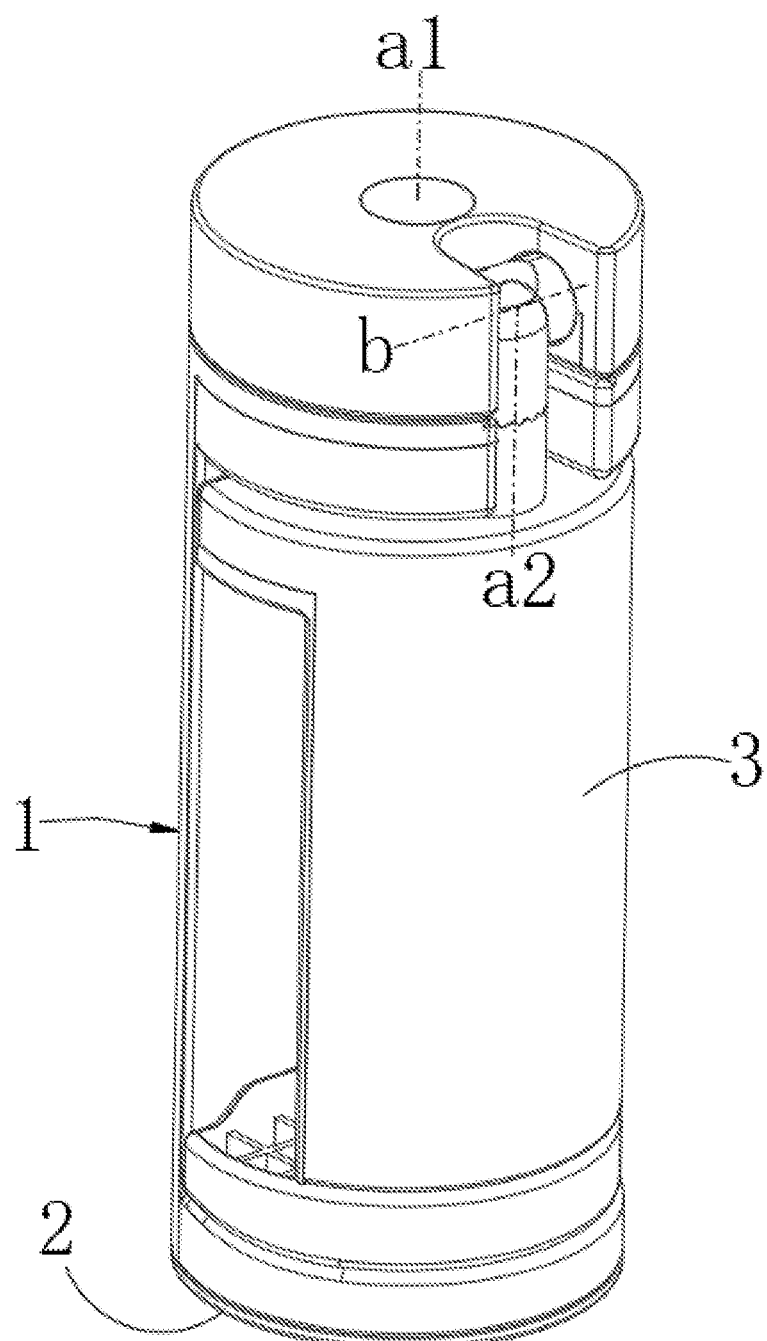
FIG. 2 illustrates a second three-dimensional structure diagram of the mobile phone bracket in the accommodating state according to an embodiment of the disclosure.
Figure 6:
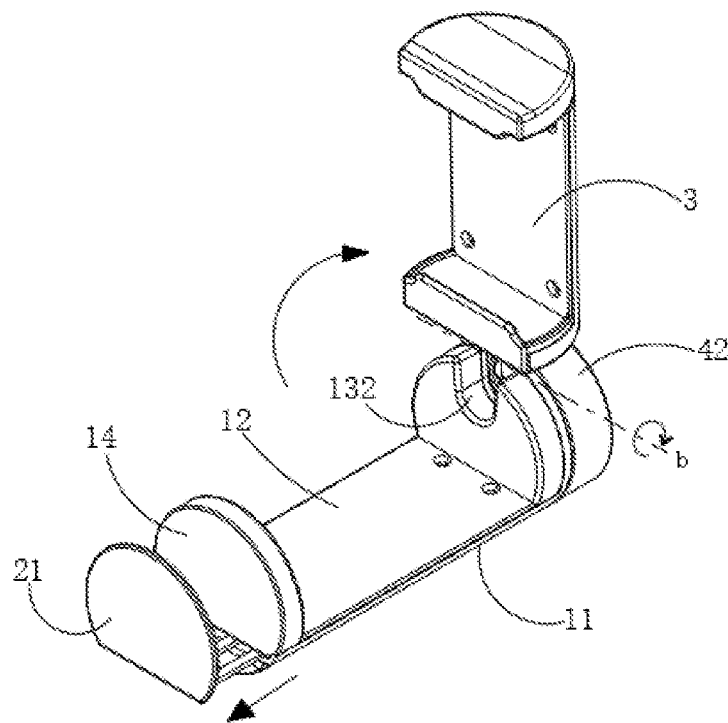
FIG. 6 illustrates a schematic diagram showing changing from the accommodating state to the deployable state of the first clamping part and the second clamping part of the mobile phone bracket according to an embodiment of the disclosure.
Figure 7:
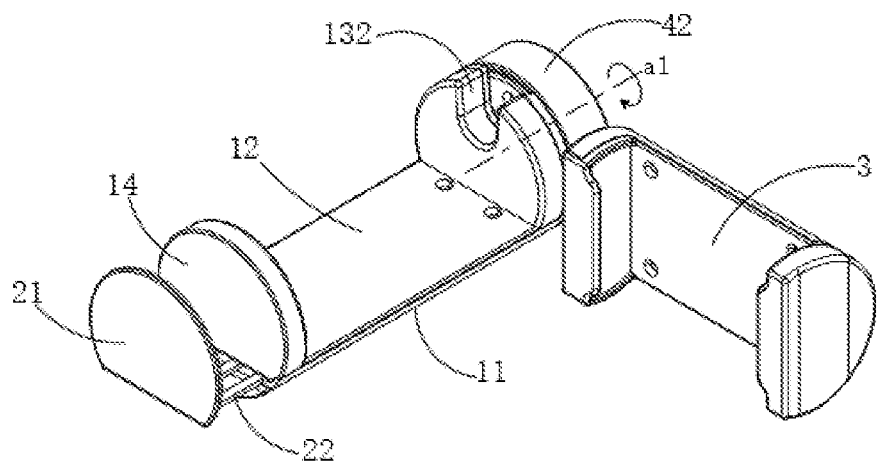
FIG. 7 illustrates a schematic diagram of the second clamping part rotating along an a1-axis of the mobile phone bracket according to an embodiment of the disclosure.
Figure 8:
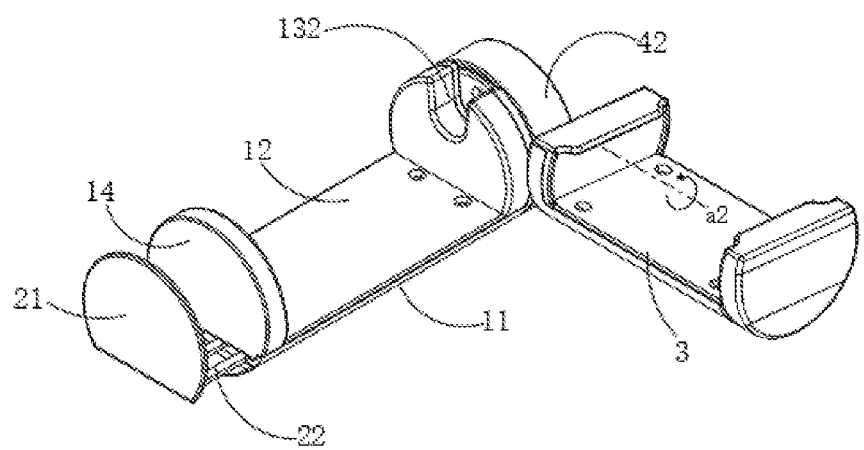
FIG. 8 illustrates a schematic diagram of the second clamping part rotating along an a2-axis of the mobile phone bracket according to an embodiment of the disclosure.
Figure 9:
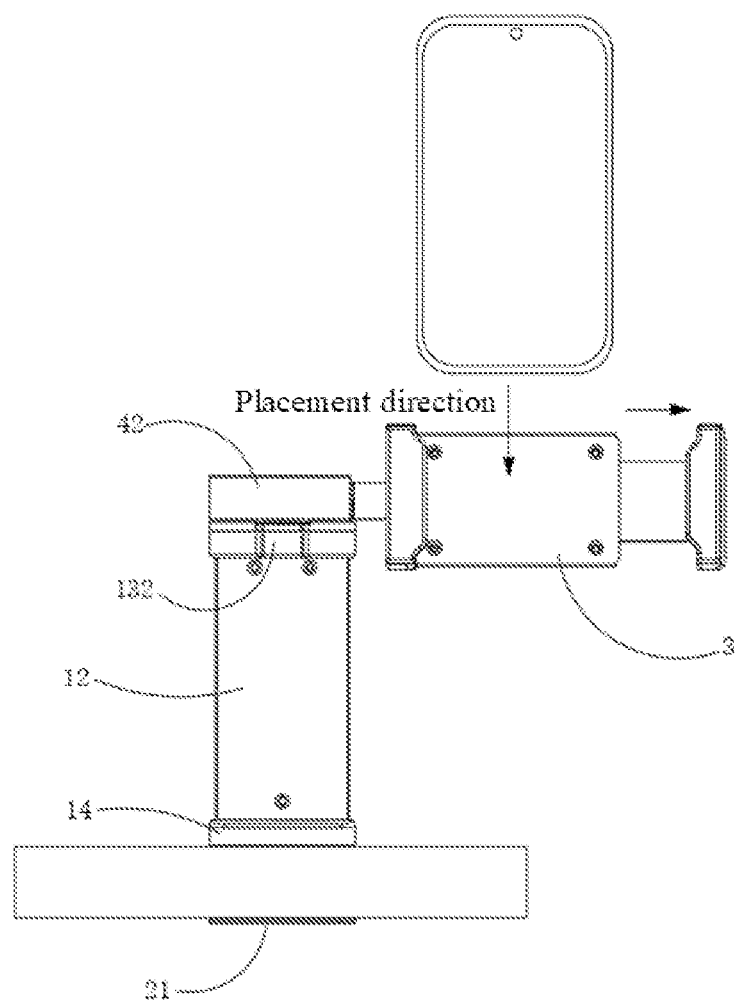
FIG. 9 illustrates a schematic diagram showing placing a mobile phone into the second clamping part when the first clamping part is clamped on a table board according to an embodiment of the disclosure.

As shown in FIG. 2, before using the mobile phone bracket of the disclosure, the first clamping part 2 and the second clamping part 3 are correspondingly accommodated in the first accommodating plate 11 and the second accommodating plate 12 to reduce an overall volume of the mobile phone bracket, which makes the mobile phone bracket easy to carry. In a situation that the mobile phone bracket is used, as shown in FIG. 6, the first clamping part 2 is clamped and fixed on a table board or other support carrier (the table board or other support carrier is not shown in FIG. 6), and the bracket body 1 is fixed to a target position by the first clamping part 2. The second clamping part 3 is rotary unfolded along the b-axis to separate the second clamping part 3 from the second accommodating plate 12, as shown in FIG. 7 and FIG. 8, a position of the second clamping part 3 is adjusted in directions of the a1-axis and the a2-axis according to an actual need of a user, thus the second clamping part 3 is adjusted at an easy to use and grip state. The second clamping part 3 can be accommodated in the second accommodating plate 12 by disposing the second clamping part 3 to rotate and swing along the b-axis, which can effectively reduce the overall volume of the mobile phone bracket for easy portability, an adjustable direction of the second clamping part 3 is more comprehensive by disposing the second clamping part 3 to rotate along the a1-axis and the a2-axis, when the first clamping part 2 is clamped and fixed on the support carrier at any angle, a direction and a position of the second clamping part 3 can be freely adjusted to adapt to a best user use state (as shown in FIG. 9, but not limited to an using state shown in FIG. 9), and an operation of the mobile phone bracket is simple, an adjustment of the mobile phone bracket is convenient, which is conducive to promotion.

Figure 5:
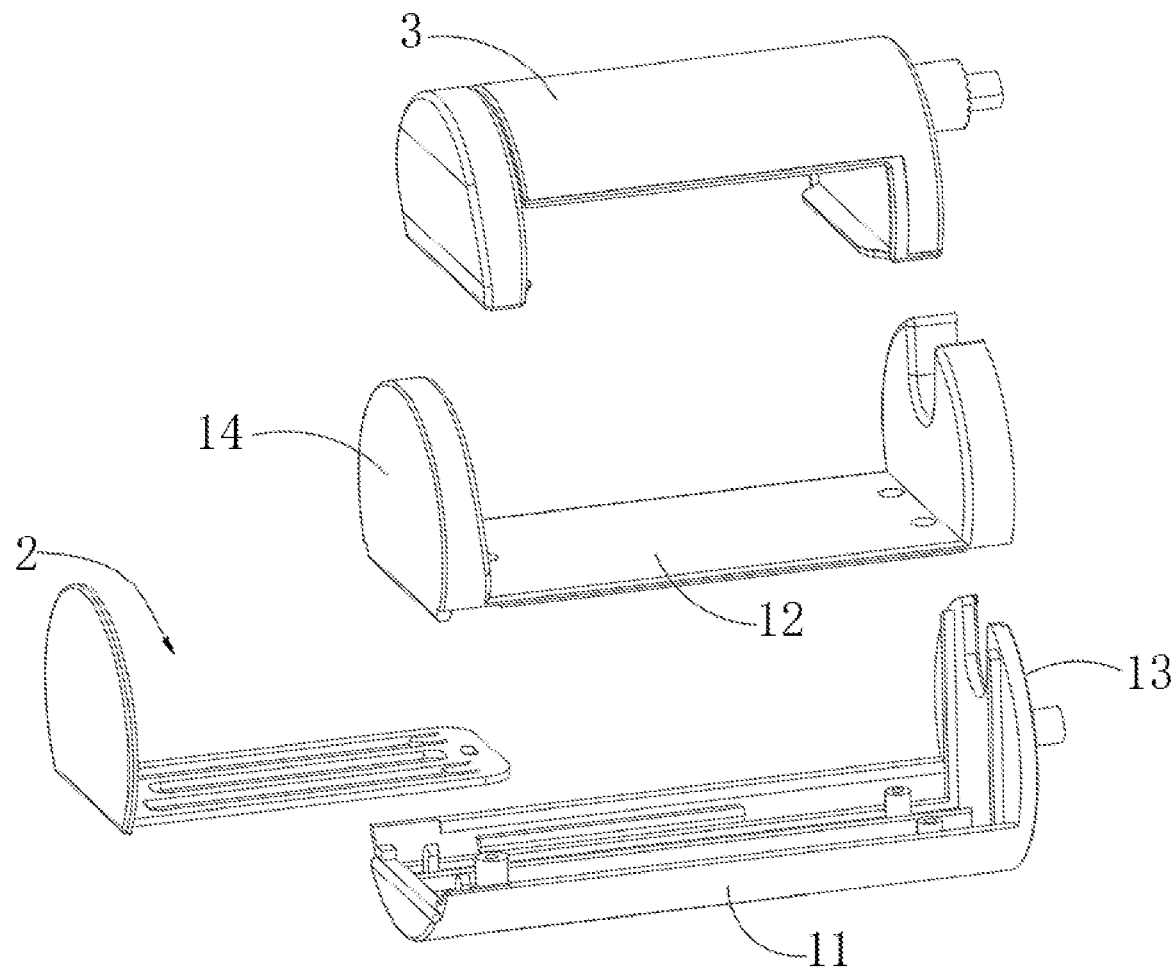
FIG. 5 illustrates a partial structural explosion diagram of a bracket body, the first clamping part and the second clamping part of the mobile phone bracket according to an embodiment of the disclosure.

The bracket body 1 in the disclosure can be a cylinder, a cuboid, a sphere or other shapes that can form an accommodating space inside, specifically, the bracket body 1 in the embodiments of the disclosure is a cylinder. FIG. 5 illustrates a partial structural explosion diagram of the bracket body 1, the first clamping part 2 and the second clamping part 3. The first accommodating plate 11 is fixedly connected to the second accommodating plate 12 to form the bracket body 1, and the first accommodating plate 11 and the second accommodating plate 12 are configured to divide an internal space of the cylinder into two spaces for accommodating, specifically, the first accommodating plate 11 occupies about three-quarters of a volume of the cylinder as a whole, a perspective in FIG. 5 is taken as an example, a space vacated above the first accommodating plate 11 is used to accommodate the second clamping part 3. When the first accommodating plate 11 is installed and combined with the second accommodating plate 12, a space between the first accommodating plate 11 and the second accommodating plate 12 occupies about one-quarter of the volume of the cylinder as a whole, and this space is used to accommodate the first clamping part 2.

Figure 3:
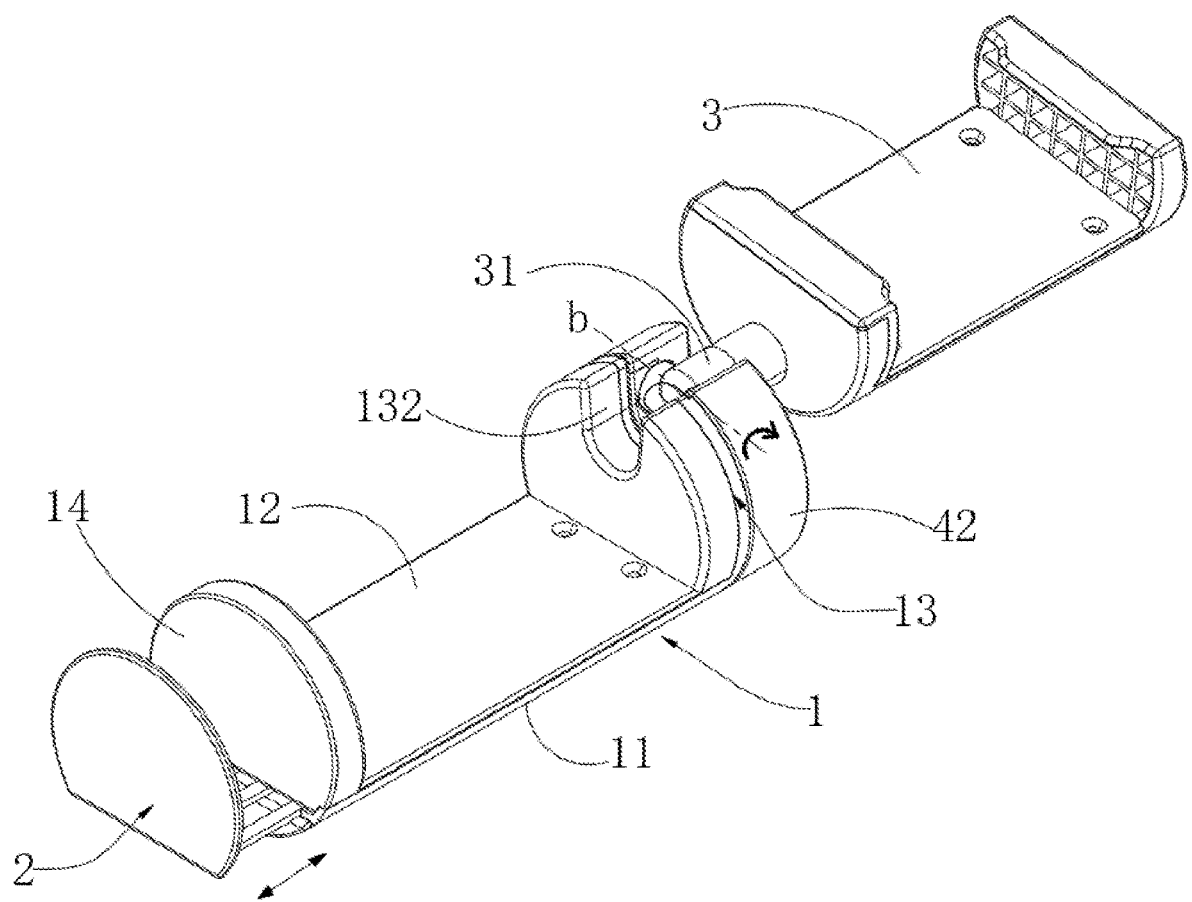
FIG. 3 illustrates a three-dimensional structure diagram of a first clamping part and a second clamping part of the mobile phone bracket in a deployable state according to an embodiment of the disclosure.
Figure 4:
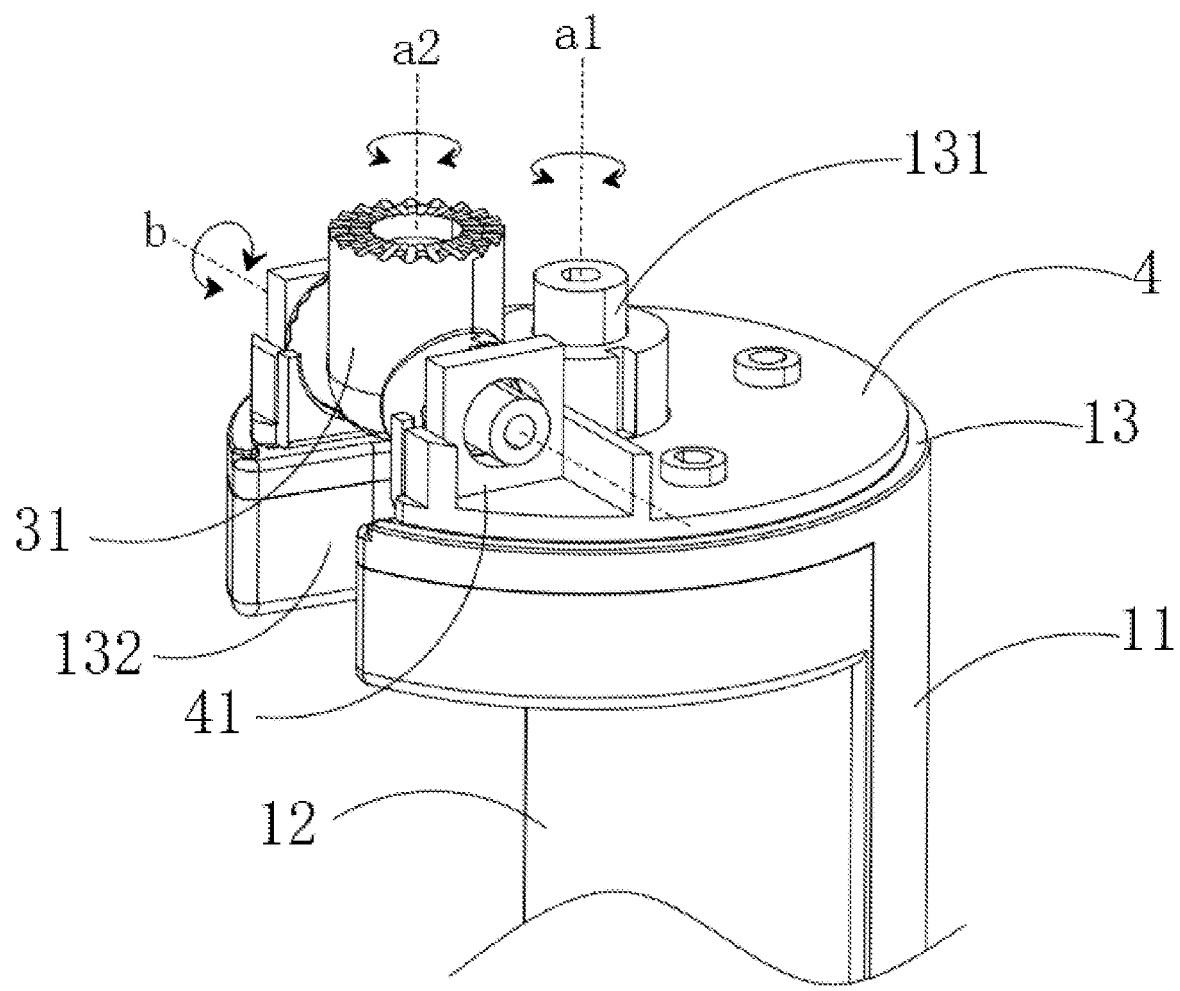
FIG. 4 illustrates a schematic diagram showing rotation directions of a support base and each member disposed thereon of the mobile phone bracket according to an embodiment of the disclosure.

Referring to FIG. 3 and FIG. 4, in the embodiments of the disclosure, the first clamping part 2 and the second clamping part 3 are respectively located on two ends of the bracket body 1 when the first clamping part 2 and the second clamping part 3 are fully unfolded. An end of the bracket body 1 is a fixed plane 14, and the fixed plane 14 is configured to cooperate with the first clamping part 2, and the bracket body 1 is fixed to the target position by the first clamping part 2. Another end of the bracket body 1 is a movable plane 13, and the movable plane 13 is provided with a support base 4 thereon. A center of the movable plane 13 is provided with a first support rotation shaft 131, and the first support rotation shaft 131 is configured to extend towards the support base 4 and penetrate through a center of the support base 4, the support base 4 is made to be movably installed on the movable plane 13 with the a1-axis as a rotating axis. The support base 4 is provided with a set of fixed members 41, and the set of fixed members 41 are fixedly disposed on the support base 4; the set of fixed members 41 are movably connected to a second support rotation shaft 31 with the b-axis as a rotating axis, and the second support rotation shaft 31 is movably connected to the second clamping part 3 with the a2-axis as a rotating axis, and the second clamping part 3 is made to rotate relative to the support base 4 along the a2-axis or the b-axis. Due to the first support rotation shaft 131 being located in the center of the support base 4, the second support rotation shaft 31 is connected to a relative eccentric position of the support base 4 by the fixed members 41, in a situation that the support base 4 is driven by the first support rotation shaft 131 to rotate, the second support rotation shaft 31 on the support base 4 is driven by the fixed members 41, and the second support rotation shaft 31 is configured to rotate eccentrically relative to the support base 4. In other embodiments, the fixed members 41 can be also disposed on the center of the support base 4 to support the second clamping part 3, so as to concentrically rotate with the support base 4. However, it needs to reserve a space for avoidance on a basis of the first support rotation shaft 131, which is equivalent to adjusting a height of the fixed members 41 upwards, thus, the second support rotation shaft 31 is located directly above the first support rotation shaft 131, however, which can easily lead to an overall volume of the mobile phone bracket being too large, inconvenient to carry, affecting an overall aesthetics, and increasing production costs. Therefore, the second support rotation shaft 31 disposed to eccentrically rotate relative to the support base 4 of the disclosure is a good embodiment.

As shown in FIG. 4, a shape of the second support rotation shaft 31 is a T-shaped, both ends of a head of the T-shaped second support rotation shaft 31 is movably connected to the set of fixed members 41, the b-axis is concentric with the head of the T-shaped second support rotation shaft 31, to thus support the T-shaped second support rotation shaft 31 to rotate and swing. The second support rotation shaft 31 is movably connected to the second clamping part 3 through a tail of the T-shaped second support rotation shaft 31, and the a2-axis is concentric with the tail of the T-shaped second support rotation shaft 31. It can be understood as that under an action of the second support rotation shaft 31, the second clamping part 3 has two rotating axes, b-axis and a1-axis, which are perpendicular to each other, and the second clamping part 3 can rotate along the a2-axis or the b-axis, an adjustment range of the second support rotation shaft 31 is wide, and an adjustment of two directions are achieved through one element, which is clever design, flexible transformation, and saving production costs.

It should be noted that in the disclosure, both of the first support rotation shaft 131 and the second support rotation shaft 31 adopt ratchet positioning rotation shafts. For details, please refer to a Chinese patent publication NO. CN112153199A. Specifically, a contact face between rotation shafts is provided with teeth, and the teeth can mesh with each other. Thus, the rotation shafts are relatively fixed, and a specific structure and principle will not be described in detail.

Moreover, the support base 4 is provided with an end cap 42 (referring to FIG. 2 and FIG. 4) thereon, and the end cap 42 is fixedly connect to the support base 4. By disposing the end cap 42, in one aspect, the support base 4 is covered to avoid dust falling; in another aspect, due to the end cap 42 rotatably connected to the support base 4, when the second clamping part 3 is rotated along the a1-axis, the user can hold the end cap 42 by a hand to rotate, which is convenient for operation.

As shown in FIG. 3 and FIG. 4, a side of the movable plane 13 is provided with a U-shaped opening 132, when the second clamping part 3 is accommodated in the bracket body 1, the U-shaped opening 132 is configured to accommodate the tail of the T-shaped second support rotation shaft 31. An avoidance position is formed for the second support rotation shaft 31 by disposing the U-shaped opening 132 on the side of the movable plane 13, the second clamping part 3 is fitly accommodated in the bracket body 1, a need to reserve movable space for the second support rotation shaft 31 in external space of the movable plane 13 is avoided, which causes an increase of the overall volume of the mobile phone bracket.

It should be illustrated that the a1-axis and the b-axis always maintain a mutually perpendicular but non intersecting positional relationship, the b-axis and the a2-axis always maintain a mutually perpendicular and intersecting positional relationship, and the second support rotation shaft 31 is configured to rotate around the b-axis, an angle between extension lines of the a1-axis and the a2-axis can vary from 0 to 180 degrees, that is, the a2-axis can swing along the b-axis.

Specifically, the a1-axis remains unchanged at the center of the support base 4, a swinging angle of the a2-axis is related to a position of the second support rotation shaft 31. In a situation that the second support rotation shaft 31 is located at a corresponding upper position of the U-shaped opening 132, due to an avoidance effect of the U-shaped opening 132 to the tail of the T-shaped second support rotation shaft 31, an angle between a swing of the a2-axis corresponding to the tail of the T-shaped second support rotation shaft 31 and the a1-axis can vary from 0 to 180 degrees; in a situation that the second support rotation shaft 31 is not located at a corresponding upper position of the U-shaped opening 132, due to an obstruction of the movable plane 13 of the bracket body 1, the angle between a swing of the a2-axis corresponding to the tail of the T-shaped second support rotation shaft 31 and the a1-axis merely varies from 0 to 90 degrees.

A work principle of the first clamping part 2 is similar with the second clamping part 3, the first clamping part is configured to clamp and fix the bracket body 1 on the table plate or the other support carrier, the second clamping part 3 is configured to clamp the mobile phone, and the second clamping part 3 is configured to fix the mobile phone to the target position. A difference between the fist clamping part 2 and the second clamping part 3 is as follows. The first clamping part 2 as a member is configured to support almost all weight of the bracket body 1, thus the first clamping part 2 needs a good stability. Therefore, while ensuring that the first clamping part 2 can be moved relative to the bracket body 1 and complete a clamping operation, an active range of the first clamping part 2 in the bracket body 1 is limited to be moved back and forth along a single straight line. The second clamping part 3 is merely configured to bear a weight of the mobile phone, a requirement for stability is lower than the first clamping part 2, and a corresponding element can be also simplified, but a basic principle is the same, and a detail description will be made by using the first clamping part 2 as an example below.

Figure 10:
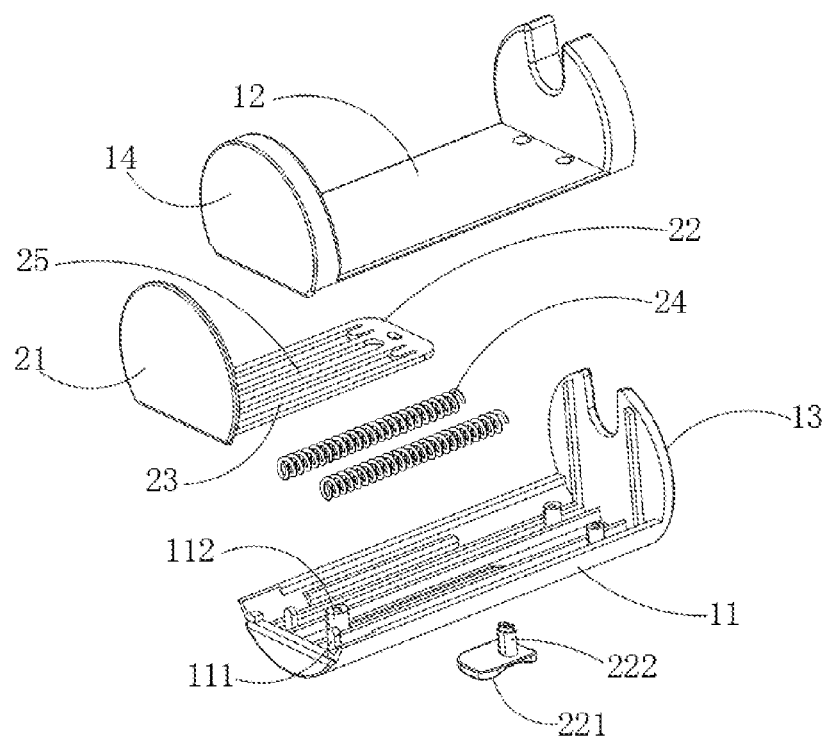
FIG. 10 illustrates an explosion schematic diagram of the bracket body and the second clamping part of the mobile phone bracket according to an embodiment of the disclosure.
Figure 11:
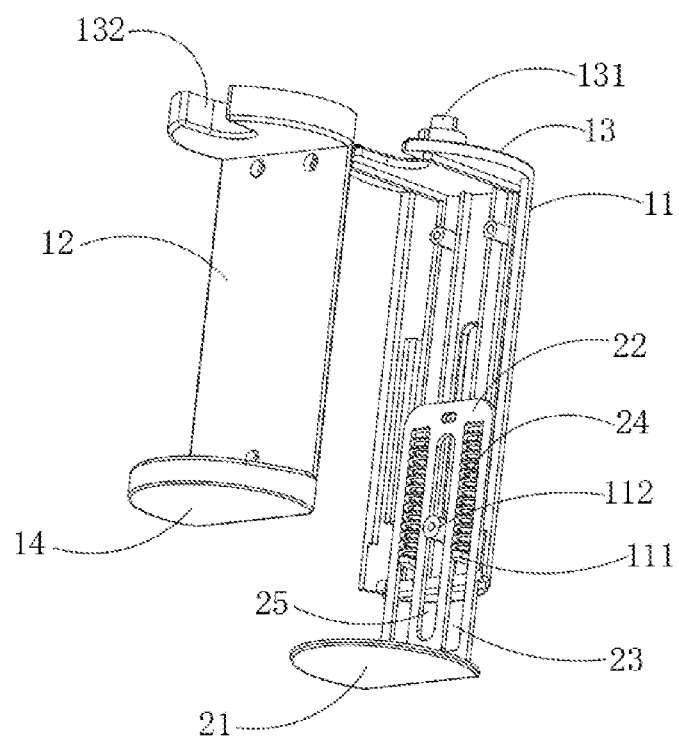
FIG. 11 illustrates a schematic diagram of a second accommodating plate in an opening state on the bracket body of the mobile phone bracket according to an embodiment of the disclosure.
Figure 12:
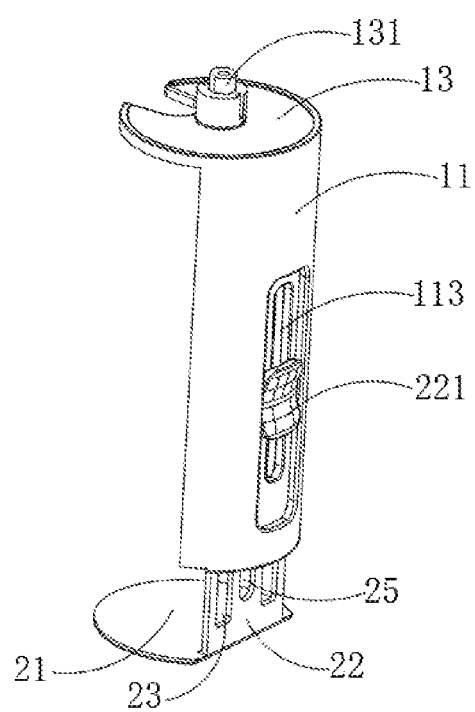
FIG. 12 illustrates an assembly schematic diagram of a slide button and the first clamping part with a first accommodating plate of the mobile phone bracket according to an embodiment of the disclosure.

As shown in FIGS. 10-12, the first clamping part 1 is configured to be pulled out and automatically retracted through a fixed gap between the first accommodating plate 11 and the second accommodating plate 12. The first clamping part 2 is a L-shaped pulling plate, a side of the L-shaped pulling plate is a clamping plate 21, and the clamping plate 21 is configured to clamp with the fixed plane 14 of the bracket body 1. Another end of the L-shaped pulling plate is an energy storage plate 22, and the energy storage plate 22 is slidably installed on the first accommodating plate 11. The energy storage plate 22 is provided with an energy storage tank 23 therein, and the energy storage tank 23 is provided with an elastic member 24 therein. The first accommodating plate 11 is provided with a stopper 111 thereon, and the stopper is configured to penetrate through the energy storage tank 23. An end of the elastic member 24 is fixed to a side of the energy storage tank 23, and another end of the elastic member 24 is configured to abut against the stopper 111. When the L-shaped pulling plate is pulled outward under force, the energy storage plate 22 is moved towards a direction of pulling open the clamping plate 21, the elastic member 24 is limited compression by a baffle, and elastic potential energy is generated. After stopping applying force to the L-shaped pulling plate, the elastic member 24 is automatically reset to drive the clamping plate 21 to be reset. In a situation that there is a table plate or other support carrier between the fixed plane 14 and the clamping plate 21 at this time, the table plate or other support carrier will be clamped by the clamping plate 21 and the fixed plane 14, so as to achieve a purpose for fixing the bracket body 1 on the table plate or other support carrier, which is convenient for operation, and has less time and energy.

It should be illustrated that in order to keep the first clamping part 2 always being moved along the single straight line. In the embodiments of the disclosure, the first accommodating plate 11 is provided with a convex column 112 thereon, the energy storage plate 22 is provided with a guide tank 25 therein, and the guide tank 25 is configured to cooperate installation with the convex column 112. When the energy storage plate 22 is slid on the first accommodating plate 11, under an orientation function of the convex column 112, the energy storage plate 22 is moved along a single direction, and a good stability of the bracket body 1 is maintained.

When the first clamping part 2 is used, a need of the user is usually more convenient, labor-saving, and quick to achieve a clamping purpose. During use of the above first clamping part 2, one hand is needed to pull the clamping plate 21 outward, and another hand is needed to hold the bracket body 1, and it is more troublesome to operate with both hands simultaneously. Therefore, as shown in FIG. 10, in the embodiment of the disclosure, an outer side of the first accommodating plate 11 is provided with a slide button 221, an outer wall of the first accommodating plate 11 is provided with a button slide groove 113. The slide button 221 is provided with a connection block 222 thereon, the connection block 222 is configured to penetrate through the button slide groove 113, and the connection block 222 is fixedly connected to an end of the energy storage plate 22. During use, the user can hold the bracket body 1 by one hand, use a thumb to press the slide button 221 from the side of the bracket body 1, the slide button 221 is slid in the button slide groove 113, and the energy storage plate 22 is driven by the connection block 222 to move towards the clamping plate 21, and the clamping plate 21 is driven to separate from the fixed plane 14 at one end of the bracket body 1, which has quick and labor-saving operation, and is convenient for users to fix the bracket body 1 on the table plate or other support carrier with one hand.

For those skilled in the art, the disclosure is not limited to details of the exemplary embodiments mentioned above obviously, and the disclosure can be implemented by other specific form without departing form a spirit or fundamental features of the disclosure. Therefore, from any perspective, the embodiments should be regarded as exemplary and non-limiting. A scope of the disclosure is limited by accompanying claims rather than the above description, and therefore aims to include all changes within a meaning and scope of equivalent elements of the claims within the disclosure. Any accompanying drawings in the claims should not be regarded as limiting the claims involved.

Moreover, it should be understood that although this specification is described according to an implementation method, not each implementation method merely includes an independent technical solution. This description method of the specification is merely for clarity. Those skilled in the art should treat the specification as a whole, and the technical solutions in each embodiment can also be appropriately combined to form other embodiments that those skilled in the art can understand.

What is claimed is:

1. A mobile phone bracket, comprising: a bracket body, a first clamping part for fixing the bracket body, and a second clamping part for clamping and fixing a mobile phone;
wherein the bracket body comprises a first accommodating plate for accommodating the first clamping part and a second accommodating plate for accommodating the second clamping part, the second clamping part is configured to rotate along a b-axis to make the second clamping part be unfolded from the second accommodating plate or be accommodated in the second accommodating plate, and the second clamping part is further configured to rotate along an a1-axis and an a2-axis to make the second clamping part be adjusted to different clamping directions relative to the bracket body;
wherein the first accommodating plate is fixedly connected to the second accommodating plate to form the bracket body, and the first accommodating plate and the second accommodating plate are configured to divide an internal space of the cylindrical bracket body into two spaces for accommodating.

2. The mobile phone bracket as claimed in claim 1, wherein the bracket body is cylindrical.

3. The mobile phone bracket as claimed in claim 1, wherein an end of the bracket body is a fixed plane, and the fixed plane is configured to cooperate with the first clamping part to fix the bracket body to a target position; another end of the bracket body is a movable plane, and the movable plane is provided with a support base thereon; a center of the movable plane is provide with a first support rotation shaft, the first support rotation shaft is configured to extend towards the support base and penetrate through a center of the support base, to make the support base be movably installed on the movable plane with the a1-axis as a rotating axis; and the support base is provided with a set of fixed members fixedly disposed on the support base, the set of fixed members are movably connected to a second support rotation shaft with the b-axis as a rotating axis, and the second support rotation shaft is movably connected to the second clamping part with the a2-axis as a rotating axis, to thus make the second clamping part to rotate relative to the support base along the a2-axis or the b-axis.

4. The mobile phone bracket as claimed in claim 3, wherein the support base is provided with an end cap thereon, and the end cap is fixedly connected to the support base.

5. The mobile phone bracket as claimed in claim 3, wherein the second clamping part is configured to be driven by the set of fixed members on the support base to rotate eccentrically relative to the bracket body.

6. The mobile phone bracket as claimed in claim 3, wherein a shape of the second support rotation shaft is a T-shaped, both ends of a head of the T-shaped second support rotation shaft are movably connected to the set of fixed members, the b-axis is concentric with the head of the T-shaped second support rotation shaft to support the T-shaped second support rotation shaft to rotate, the second support rotation shaft is movably connected to the second clamping part through a tail of the T-shaped second support rotation shaft, and the a2-axis is concentric with the tail of the T-shaped second support rotation shaft.

7. The mobile phone bracket as claimed in claim 6, wherein a side of the movable plane is provided with a U-shaped opening, the U-shaped opening is configured to accommodate the tail of the T-shaped second support rotation shaft when the second clamping part is accommodated in the bracket body.

8. The mobile phone bracket as claimed in claim 1, wherein the first clamping part is configured to be pulled out from a gap between the first accommodating plate and the second accommodating plate and configured to be automatically retracted into the gap; the first clamping part is a L-shaped pulling plate, a side of the L-shaped pulling plate is a clamping plate, and the clamping plate is configured to clamp with a fixed plane of the bracket body; another end of the L-shaped pulling plate is an energy storage plate, and the energy storage plate is slidably installed on the first accommodating plate; the energy storage plate is provided with an energy storage tank thereon, and the energy storage tank is provided with an elastic member therein; the first accommodating plate is provided with a stopper thereon, and the stopper is configured to penetrate through the energy storage tank; and an end of the elastic member is fixed to a side of the energy storage tank, and another end of the elastic member is configured to abut against the stopper.

9. The mobile phone bracket as claimed in claim 8, wherein the first clamping part is configured to move back and forth along a single straight line, the first accommodating plate is provided with a convex column thereon, and the energy storage plate is provided with a guide tank therein for cooperating installation with the convex column.

10. The mobile phone bracket as claimed in claim 9, wherein an outer side of the first accommodating plate is provided with a slide button, an outer wall of the first accommodating plate is provided with a button sliding groove, the slide button is provided with a connection block thereon, and the connection block is configured to penetrate through the button sliding groove and fixedly connect to an end of the energy storage plate.

11. A mobile phone bracket, comprising: a bracket body, a first clamping part for fixing the bracket body, and a second clamping part for clamping and fixing a mobile phone;
wherein the bracket body comprising a first accommodating plate for accommodating the first clamping part and a second accommodating plate for accommodating the second clamping part; and the first clamping part is configured to be pulled out from a gap between the first accommodating plate and the second accommodating plate and configured to be automatically retracted into the gap.

12. The mobile phone bracket as claimed in claim 11, wherein the bracket body is cylindrical, the first accommodating plate is fixedly connected to the second accommodating plate to form the bracket body, and the first accommodating plate and the second accommodating plate are configured to divide an internal space of the cylindrical bracket body into two spaces for accommodating; and
wherein the first clamping part is a L-shaped pulling plate, a side of the L-shaped pulling plate is a clamping plate, and the clamping plate is configured to clamp with a fixed plane of the bracket body; another end of the L-shaped pulling plate is an energy storage plate, and the energy storage plate is slidably installed on the first accommodating plate; the energy storage plate is provided with an energy storage tank thereon, and the energy storage tank is provided with an elastic member therein; the first accommodating plate is provided with a stopper thereon, and the stopper is configured to penetrate through the energy storage tank; and an end of the elastic member is fixed to a side of the energy storage tank, and another end of the elastic member is configured to abut against the stopper; and the first accommodating plate is provided with a convex column thereon, and the energy storage plate is provided with a guide tank therein for cooperating installation with the convex column.

13. The mobile phone bracket as claimed in claim 12, wherein an outer side of the first accommodating plate is provided with a slide button, an outer wall of the first accommodating plate is provided with a button sliding groove, the slide button is provided with a connection block thereon, and the connection block is configured to penetrate through the button sliding groove and fixedly connect to an end of the energy storage plate.

14. The mobile phone bracket as claimed in claim 11, wherein the second clamping part is configured to rotate along a b-axis to make the second clamping part be unfolded from the second accommodating plate or be accommodated in the second accommodating plate, and the second clamping part is further configured to rotate along an a1-axis and an a2-axis to make the second clamping part be adjusted to different clamping directions relative to the bracket body.

15. The mobile phone bracket as claimed in claim 14, wherein an end of the bracket body is a fixed plane, and the fixed plane is configured to cooperate with the first clamping part to fix the bracket body to a target position; another end of the bracket body is a movable plane, and the movable plane is provided with a support base thereon; a center of the movable plane is provide with a first support rotation shaft, the first support rotation shaft is configured to extend towards the support base and penetrate through a center of the support base, to make the support base be movably installed on the movable plane with the a1-axis as a rotating axis; and the support base is provided with a set of fixed members fixedly disposed on the support base, the set of fixed members are movably connected to a second support rotation shaft with the b-axis as a rotating axis, and the second support rotation shaft is movably connected to the second clamping part with the a2-axis as a rotating axis, to thus make the second clamping part to rotate relative to the support base along the a2-axis or the b-axis.

16. The mobile phone bracket as claimed in claim 15, wherein the support base is provided with an end cap thereon, and the end cap is fixedly connected to the support base; and wherein the second clamping part is configured to be driven by the set of fixed members on the support base to rotate eccentrically relative to the bracket body.

17. The mobile phone bracket as claimed in claim 16, wherein a shape of the second support rotation shaft is a T-shaped, both ends of a head of the T-shaped second support rotation shaft are movably connected to the set of fixed members, the b-axis is concentric with the head of the T-shaped second support rotation shaft to support the T-shaped second support rotation shaft to rotate, the second support rotation shaft is movably connected to the second clamping part through a tail of the T-shaped support rotation shaft, and the a2-axis is concentric with the tail of the T-shaped support rotation shaft.

18. The mobile phone bracket as claimed in claim 17, wherein a side of the movable plane is provided with a U-shaped opening, the U-shaped opening is configured to accommodate the tail of the T-shaped second support rotation shaft when the second clamping part is accommodated in the bracket body.

19. A mobile phone bracket, comprising: a bracket body, a first clamping part for fixing the bracket body, and a second clamping part for clamping and fixing a mobile phone;

wherein the bracket body comprises a first accommodating plate for accommodating the first clamping part and a second accommodating plate for accommodating the second clamping part, the second clamping part is configured to rotate along a b-axis to make the second clamping part be unfolded from the second accommodating plate or be accommodated in the second accommodating plate, and the second clamping part is further configured to rotate along an a1-axis and an a2-axis to make the second clamping part be adjusted to different clamping directions relative to the bracket body;

wherein the first clamping part is configured to be pulled out from a gap between the first accommodating plate and the second accommodating plate and configured to be automatically retracted into the gap; the first clamping part is a L-shaped pulling plate, a side of the L-shaped pulling plate is a clamping plate, and the clamping plate is configured to clamp with a fixed plane of the bracket body; another end of the L-shaped pulling plate is an energy storage plate, and the energy storage plate is slidably installed on the first accommodating plate; the energy storage plate is provided with an energy storage tank thereon, and the energy storage tank is provided with an elastic member therein; the first accommodating plate is provided with a stopper thereon, and the stopper is configured to penetrate through the energy storage tank; and an end of the elastic member is fixed to a side of the energy storage tank, and another end of the elastic member is configured to abut against the stopper.

* * * * *